United States Patent
Wang et al.

(10) Patent No.: US 10,278,093 B2
(45) Date of Patent: Apr. 30, 2019

(54) METHOD, APPARATUS, AND SYSTEM FOR QOS PARAMETER CONFIGURATION IN WLAN

(71) Applicant: Huawei Technologies Co., Ltd., Shenzhen (CN)

(72) Inventors: Yungui Wang, Nanjing (CN); Fuqing Sun, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 280 days.

(21) Appl. No.: 15/199,153

(22) Filed: Jun. 30, 2016

(65) Prior Publication Data
US 2017/0006494 A1 Jan. 5, 2017

(30) Foreign Application Priority Data
Jun. 30, 2015 (CN) .......................... 2015 1 0374955

(51) Int. Cl.
*H04W 28/02* (2009.01)
*H04W 28/24* (2009.01)
(Continued)

(52) U.S. Cl.
CPC ....... *H04W 28/0268* (2013.01); *H04W 8/005* (2013.01); *H04W 28/24* (2013.01);
(Continued)

(58) Field of Classification Search
CPC .. H04W 24/02; H04W 28/0252; H04W 48/08
See application file for complete search history.

(56) References Cited

U.S. PATENT DOCUMENTS

2006/0050742 A1* 3/2006 Grandhi ............ H04W 74/0816
   370/506
2006/0215686 A1* 9/2006 Takeuchi ............. H04W 28/18
   370/445

(Continued)

FOREIGN PATENT DOCUMENTS

| CN | 104247548 A | 12/2014 |
|----|-------------|---------|
| WO | 2013130998 A1 | 9/2013 |
| WO | 2013158899 A1 | 10/2013 |

OTHER PUBLICATIONS

Foreign Communication From A Counterpart Application, Japanese Application No. 2016-128605, Japanese Notice of Allowance dated Oct. 3, 2017, 3 pages.
(Continued)

*Primary Examiner* — Edan Orgad
*Assistant Examiner* — Emmanuel K Maglo
(74) *Attorney, Agent, or Firm* — Conley Rose, P.C.

(57) ABSTRACT

A method, an apparatus, and a system for quality of service (QoS) parameter configuration in a wireless local area network (WLAN), where the method includes sending, by a network device, a default first QoS parameter set to a terminal, sending, by the network device, a QoS parameter set modification message including a second QoS parameter set to the terminal, where the second QoS parameter set is different from the first QoS parameter set, and the QoS parameter set modification message is a unicast beacon frame or an active probe response frame. In this way, the second QoS parameter set different from the first QoS parameter set is sent to the terminal using the unicast beacon frame or the active probe response frame, which ensures that the network device dynamically adjusts a QoS parameter set of the terminal on a per terminal basis, thereby improving data transmission efficiency and user experience.

14 Claims, 5 Drawing Sheets

(51) Int. Cl.
*H04W 48/10* (2009.01)
*H04W 8/00* (2009.01)
*H04W 74/08* (2009.01)
*H04W 84/12* (2009.01)

(52) U.S. Cl.
CPC ........ *H04W 48/10* (2013.01); *H04W 74/0875* (2013.01); *H04W 84/12* (2013.01)

(56) References Cited

U.S. PATENT DOCUMENTS

| | | | | |
|---|---|---|---|---|
| 2007/0206552 | A1* | 9/2007 | Yaqub | H04W 28/24 370/338 |
| 2009/0279427 | A1* | 11/2009 | Ji | H04W 74/0816 370/230 |
| 2010/0150116 | A1* | 6/2010 | Ji | H04W 74/0875 370/338 |
| 2010/0284380 | A1* | 11/2010 | Banerjee | H04W 16/14 370/338 |
| 2012/0140615 | A1* | 6/2012 | Gong | H04B 7/0452 370/216 |
| 2013/0266136 | A1* | 10/2013 | Chu | H04K 1/003 380/34 |
| 2013/0279427 | A1* | 10/2013 | Wentink | H04W 74/002 370/329 |
| 2014/0241226 | A1* | 8/2014 | Jia | H04W 48/14 370/311 |
| 2014/0269317 | A1* | 9/2014 | Wang | H04L 69/04 370/235 |
| 2014/0334368 | A1* | 11/2014 | Zhou | H04W 4/08 370/311 |
| 2015/0098459 | A1* | 4/2015 | Lee | H04W 48/14 370/338 |
| 2015/0124776 | A1* | 5/2015 | Lee | H04W 76/16 370/331 |
| 2015/0351115 | A1* | 12/2015 | Jeon | H04W 48/16 455/450 |
| 2015/0359008 | A1* | 12/2015 | Wang | H04W 74/004 370/330 |
| 2016/0316397 | A1* | 10/2016 | Pantelidou | H04W 48/02 |

OTHER PUBLICATIONS

Calhoun, P., Ed., et al., "Control and Provisioning of Wireless Access Points (CAPWAP) Protocol Specification," RFC 5415, Mar. 2009, 155 pages.
"Part 11: Wireless LAN Medium Access Control (MAC) and Physical Layer (PHY) Specifications, Amendment 8: Medium Access Control (MAC) Quality of Service Enhancements," IEEE Computer Society, IEEE Std 802.11e, Nov. 11, 2005, 211 pages.
Foreign Communication From A Counterpart Application, European Application No. 16177065.6, Extended European Search Report dated Nov. 3, 2016, 8 pages.
Machine Translation and Abstract of Chinese Publication No. CN104247548, Dec. 24, 2014, 43 pages.
Foreign Communication From a Counterpart Application, Chinese Application No. 201510374955.8, Chinese Office Action dated Feb. 3, 2019, 6 pages.

* cited by examiner

METHOD, APPARATUS, AND SYSTEM FOR QOS PARAMETER CONFIGURATION IN WLAN

CROSS-REFERENCE TO RELATED APPLICATION

This application claims priority to Chinese Patent Application No. 201510374955.8, filed on Jun. 30, 2015, which is hereby incorporated by reference in its entirety.

TECHNICAL FIELD

This application relates to the field of communications technologies, and in particular, to a method, an apparatus, and a system for quality of service (QoS) parameter configuration in a wireless local area network (WLAN).

BACKGROUND

A WLAN is widely applied in various places. The WLAN includes a radio access point (AP) and a terminal, where the terminal accesses a network using the radio AP. A wireless controller may further be added to the WLAN, to manage the AP.

Enhanced distributed channel access (EDCA) may be used in the WLAN, to provide a priority-based access mechanism. In a network using the EDCA, the radio AP sends an EDCA parameter set element that includes a QoS parameter set to the terminal. The QoS parameter set includes QoS parameters, for different access categories (AC), of the terminal. The ACs include: AC_BE (which means best effort), AC_BK (which means background), AC_VI (which means video), and AC_VO (which means voice). A QoS parameter (that is, an access channel configuration parameter) of each access category includes a minimum size and a maximum size of an exponent form of contention window, a transmission opportunity (TXOP) limitation, and the like. In this way, a different value is set for the QoS parameter of each access category such that some real-time multimedia services (such as services of an AC_VI and AC_VO type) can have more opportunities to access a channel. Therefore, a delay of a real-time multimedia service is reduced, data transmission of the real-time multimedia service is more fluent, and user experience is improved.

A network device (a radio AP or a wireless controller) may generate an EDCA parameter set element based on a set QoS parameter set, and adds the EDCA parameter set element to a beacon frame broadcast to the terminal, an association response frame sent to the terminal, or a probe response frame sent to the terminal. However, the network device cannot dynamically adjust a QoS parameter set of the terminal on a per terminal basis, resulting in low data transmission efficiency and poor user experience.

SUMMARY

This application provide a method, an apparatus, and a system for QoS parameter configuration in a WLAN, to resolve problems of low data transmission efficiency and poor user experience due to that a network device cannot dynamically adjust a QoS parameter set of a terminal on a per terminal basis.

Specific technical solutions provided in this application are as follows.

According to a first aspect, a method for QoS parameter configuration in a WLAN is provided, including sending, by the network device to the terminal, an association response frame carrying a first QoS parameter set after a network device receives an association request frame sent by a terminal, where the first QoS parameter set is a default QoS parameter set, the first QoS parameter set includes multiple QoS parameters, for different AC of access channels, of the terminal, and the network device is an AP or a wireless controller managing the AP, and sending, by the network device, a QoS parameter set modification message to the terminal, where the QoS parameter set modification message includes a second QoS parameter set, the second QoS parameter set is different from the first QoS parameter set, and the QoS parameter set modification message is a first beacon frame or an active probe response frame, where a recipient address of the first beacon frame is a medium access control (MAC) address of the terminal, and the MAC address of the terminal is a unicast address, and the active probe response frame is a probe response frame actively sent by the network device to the terminal without relying on a probe request frame sent by the terminal.

With reference to the first aspect, in a first possible implementation manner of the first aspect, before sending, by the network device, a QoS parameter set modification message to the terminal, the method further includes acquiring, by the network device, a data packet of the terminal, determining, by the network device according to a priority of the data packet, that an access category of the data packet is a first access category, and determining that a protocol category of the data packet is a high priority protocol category, determining, by the network device according to a preset correspondence between multiple AC and multiple protocol categories, a second access category corresponding to the high priority protocol category, where a priority of the second access category is higher than a priority of the first access category, acquiring, by the network device, a high priority QoS parameter according to a preset correspondence between multiple AC and multiple QoS parameters, where the high priority QoS parameter is a QoS parameter corresponding to the second access category, and generating, by the network device, the second QoS parameter set according to the QoS parameter corresponding to the determined second access category, where a QoS parameter of the first access category in the second QoS parameter set is the high priority QoS parameter.

With reference to the first aspect, in a second possible implementation manner of the first aspect, before sending, by the network device, a QoS parameter set modification message to the terminal, the method further includes determining, by the network device, an identity category of the terminal, and determining, by the network device according to a preset correspondence between multiple identity categories and multiple QoS parameter sets, that the second QoS parameter set is a QoS parameter set corresponding to the identity category of the terminal.

With reference to the first aspect and either of the first and the second possible implementation manners of the first aspect, in a third possible implementation manner of the first aspect, the method further includes periodically broadcasting, by the AP, a second beacon frame when the network device is an AP, where the second beacon frame carries an EDCA parameter set element lacking a QoS parameter set.

According to a second aspect, an apparatus for QoS parameter configuration in a WLAN is provided, where the apparatus for QoS parameter configuration is implemented by a network device, the network device is an AP or a wireless controller managing the AP, and the apparatus includes a first sending unit configured to send, to the terminal, an association response frame carrying a first QoS parameter set after an association request frame sent by a terminal is received, where the first QoS parameter set is a default QoS parameter set, and the first QoS parameter set includes multiple QoS parameters, for different AC of access channels, of the terminal, and a second sending unit configured to send a QoS parameter set modification message to the terminal, where the QoS parameter set modification message includes a second QoS parameter set, the second QoS parameter set is different from the first QoS parameter set, and the QoS parameter set modification message is a first beacon frame or an active probe response frame, where a recipient address of the first beacon frame is a MAC address of the terminal, and the MAC address of the terminal is a unicast address, and the active probe response frame is a probe response frame actively sent by the apparatus to the terminal without relying on a probe request frame sent by the terminal.

With reference to the second aspect, in a first possible implementation manner of the second aspect, the apparatus further includes a determining unit configured to acquire a data packet of the terminal before the second sending unit sends the QoS parameter set modification message to the terminal, determine, according to a priority of the data packet, that an access category of the data packet is a first access category, determine that a protocol category of the data packet is a high priority protocol category, determine, according to a preset correspondence between multiple AC and multiple protocol categories, a second access category corresponding to the high priority protocol category, where a priority of the second access category is higher than a priority of the first access category, acquire a high priority QoS parameter according to a preset correspondence between multiple AC and multiple QoS parameters, where the high priority QoS parameter is a QoS parameter corresponding to the second access category, and generate the second QoS parameter set according to the QoS parameter corresponding to the determined second access category, where a QoS parameter of the first access category in the second QoS parameter set is the high priority QoS parameter.

With reference to the second aspect, in a second possible implementation manner of the second aspect, the apparatus further includes a determining unit configured to determine an identity category of the terminal before the second sending unit sends the QoS parameter set modification message to the terminal, and determine, according to a preset correspondence between multiple identity categories and multiple QoS parameter sets, that the second QoS parameter set is a QoS parameter set corresponding to the identity category of the terminal.

With reference to the second aspect and either of the first and the second possible implementation manners of the second aspect, in a third possible implementation manner of the second aspect, the network device is an AP, and the first sending unit is further configured to periodically broadcast a second beacon frame, where the second beacon frame carries an EDCA parameter set element lacking a QoS parameter set.

According to a third aspect, a system for QoS parameter configuration in a WLAN is provided, including an AP and a wireless controller managing the AP, where the wireless controller is configured to send, to the terminal, an association response frame carrying a first QoS parameter set after an association request frame sent by a terminal is received, where the first QoS parameter set is a default QoS parameter set, and the first QoS parameter set includes multiple QoS parameters, for different AC of access channels, of the terminal, and send a QoS parameter set modification message to the terminal, where the QoS parameter set modification message includes a second QoS parameter set, the second QoS parameter set is different from the first QoS parameter set, and the QoS parameter set modification message is a first beacon frame or an active probe response frame, where a recipient address of the first beacon frame is a MAC address of the terminal, and the MAC address of the terminal is a unicast address, and the active probe response frame is a probe response frame actively sent by the wireless controller to the terminal without relying on a probe request frame sent by the terminal, and the AP is configured to send the association request frame to the wireless controller after the association request frame sent by the terminal is received, receive the association response frame that carries the first QoS parameter set and that is sent by the wireless controller, send the association response frame to the terminal, receive the QoS parameter set modification message sent by the wireless controller, forward the QoS parameter set to the terminal, and periodically broadcast a second beacon frame, where the second beacon frame carries an EDCA parameter set element lacking a QoS parameter set.

According to the method for QoS parameter configuration in a WLAN provided in the present disclosure, a network device sends a default first QoS parameter set to a terminal, and the network device sends a QoS parameter set modification message including a second QoS parameter set to the terminal, where the second QoS parameter set is different from the first QoS parameter set, and the QoS parameter set modification message is a unicast beacon frame or an active probe response frame. In this way, the second QoS parameter set different from the first QoS parameter set is sent to the terminal using the unicast beacon frame or the active probe response frame, which ensures that the network device dynamically adjusts a QoS parameter set of the terminal on a per terminal basis, thereby improving data transmission efficiency and user experience.

DESCRIPTION OF EMBODIMENTS

To make the objectives, technical solutions, and advantages of the present disclosure clearer, the following further describes the present disclosure in detail with reference to the accompanying drawings.

Embodiments of the present disclosure provide an access channel configuration method, apparatus, and system, to resolve problems of low data transmission efficiency and poor user experience due to that a network device cannot dynamically adjust a QoS parameter set of a terminal on a per terminal basis. The method, the apparatus, and the system are based on a same inventive concept. Because a problem-resolving principle of the method is similar to that of the apparatus, implementations of the apparatus and the method may be cross-referenced. A repeated description is not given again.

In the embodiments of the present disclosure, a network device sends a default first QoS parameter set to a terminal, and the network device sends a QoS parameter set modification message including a second QoS parameter set to the terminal, where the second QoS parameter set is different from the first QoS parameter set, and the QoS parameter set modification message is a unicast beacon frame or an active probe response frame. In this way, the second QoS parameter set different from the first QoS parameter set is sent to the terminal using the unicast beacon frame or the active probe response frame, which ensures that the network device dynamically adjusts a QoS parameter set of the terminal on a per terminal basis, thereby improving data transmission efficiency and user experience.

The following describes preferred implementation manners of the present disclosure in detail with reference to the accompanying drawings.

The present disclosure provides a method and an apparatus for QoS parameter configuration in a WLAN. The method and the apparatus can be applied, but not limited to, a WLAN network architecture shown in FIG. 1. The network architecture includes a wireless controller 101, a radio AP 102, and a terminal 103.

Figure 1:
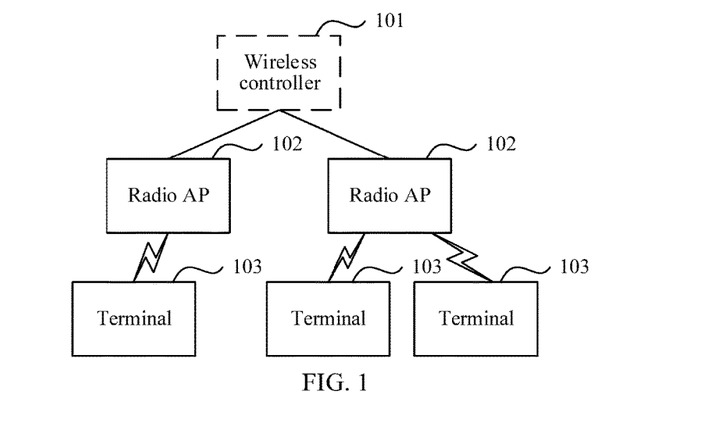
FIG. 1 is a schematic diagram of a WLAN network architecture according to an embodiment of the present disclosure.

The wireless controller 101 may be a server, an access gateway, a network switch, a router, or the like. The wireless controller 101 is responsible for controlling or managing the radio AP 102. The wireless controller 101 may perform service configuration and radio frequency configuration on the radio AP 102.

The radio AP 102, or referred as to the AP for short, includes a station (STA) and provides an access to a distribution service for an associated STA using a wireless medium (WM).

The terminal 103 may be a mobile phone, a computer, a tablet computer, a personal digital assistant (PDA), a mobile Internet device (MID), a wearable device, an electronic book (e-book) reader, or the like. The terminal 103 is used as a STA in the WLAN and is associated with the radio AP 102.

Figure 2:
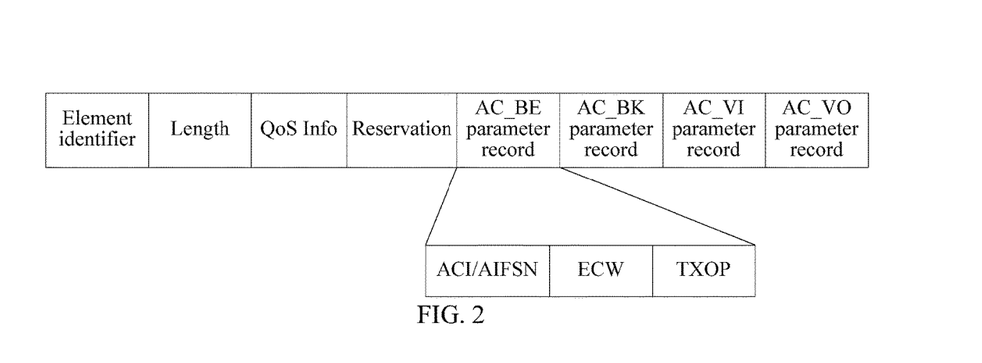
FIG. 2 is a schematic structural diagram of an EDCA parameter set element according to an embodiment of the present disclosure.

Referring to FIG. 2, as stipulated in an EDCA parameter set element, different QoS parameters are set for different AC, and a meaning of each field is as follows.

Element identifier (Element ID) is a unique identifier of the EDCA parameter set element, and is used to distinguish from another element.

Length is a parameter length of the EDCA parameter set element, excluding the element identifier and a length field.

QoS Info represents quality of service information. This field includes a suboption. The suboption is an EDCA parameter set update count, used to notify the terminal whether the EDCA parameter set element is changed.

The EDCA parameter set element further includes a parameter record field of each access category. A QoS parameter used when the terminal executes the access category is defined in each parameter record field. As shown in the figure, the parameter record field of each access category includes an AC index (ACI)/arbitration interframe space number (AIFSN), an exponent form of contention window, and a TXOP limitation.

The ACI/AIFSN includes an AIFSN. The AIFSN indicates a quantity of timeslots delayed after a short interframe space (SIFS) time and when the terminal accesses a network. A smaller parameter value indicates a shorter time that the terminal waits for accessing a channel.

An ECW is a size of an EDCA contention window. The value determines a value of an average backoff time of the terminal, and a smaller value indicates a shorter average backoff time of the terminal. The ECW parameter includes a minimum size of the ECW (ECWmin) and a maximum size of the ECW (ECWmax).

The TXOP limitation represents a limitation on a time for the terminal to occupy wireless medium transmission data. A greater value indicates a longer time for the terminal to persistently occupy a channel.

QoS parameters such as the AISFN, the ECW, and the TXOP that are included in the parameter record field of each access category in an EDCA parameter set element are collectively referred to as a QoS parameter set.

The network device sends the EDCA parameter set element to the terminal. The EDCA parameter set element includes a QoS parameter set that is set by the network device for the terminal and that is used for processing AC. The network device configures different QoS parameters for different AC. For example, the network device configures a relatively small AIFSN, ECWmin, and ECWmax, and a relatively large TXOP for AC_VI and AC_VO that need to be transmitted in real time, and configures a relatively large AIFSN, ECWmin and ECWmax, and a relatively small TXOP for another access category. Therefore, AC_VI and AC_VO services have relatively high priorities when a channel is accessed, and another service has a relatively low priority, which satisfies a real-time service requirement and obtains better service experience.

Conventionally, a radio AP sends an EDCA parameter set element to a terminal in a broadcast manner, which includes the following manners: sending, by the radio AP by broadcasting a beacon frame, the EDCA parameter set element to a terminal associated with the radio AP, determining, by the terminal using QoS Info, whether the EDCA parameter set element is changed, and updating, by the terminal, a local EDCA parameter set element if the EDCA parameter set element is changed, or sending, by the radio AP, the EDCA parameter set element to a specified terminal using an association response frame or a probe response frame after receiving an association request frame or a probe request frame of a radio access terminal.

However, even though a QoS parameter set can be dynamically adjusted in a manner of sending the EDCA parameter set element by broadcasting a beacon frame, because the EDCA parameter set element is sent to all terminals in a broadcast manner, a terminal cannot be adjusted on a per terminal basis in such a manner. In a manner of sending the EDCA parameter set element using the association response frame or the probe response frame, an EDCA parameter set element can be generated for a terminal only when an association request frame or a probe request frame of the terminal is received, that is, before the terminal is associated with an AP. The EDCA parameter set element cannot be dynamically configured for the terminal in such a manner.

Figure 3:
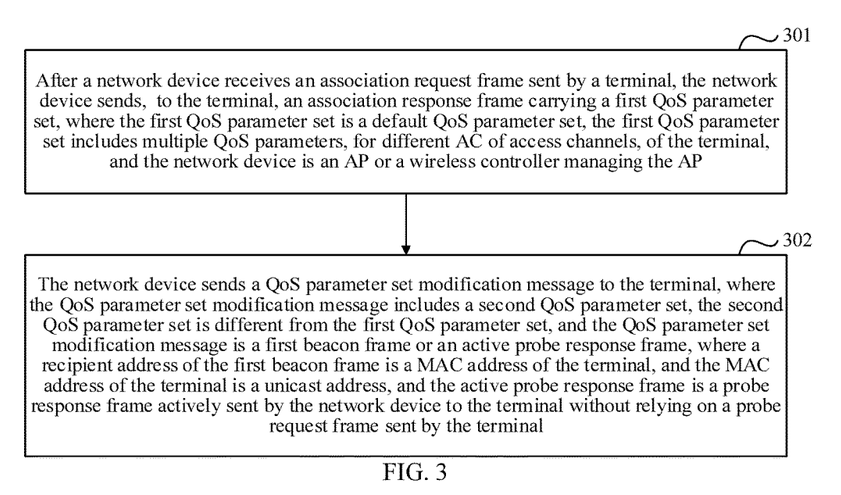
FIG. 3 is a flowchart of a method for QoS parameter configuration in a WLAN according to an embodiment of the present disclosure.

Referring to FIG. 3, a method for QoS parameter configuration in a WLAN provided in an embodiment of the present disclosure is applied to a network device, for example, a wireless controller or a radio AP. A processing procedure of the method includes the following steps.

Step 301: After a network device receives an association request frame sent by a terminal, the network device sends, to the terminal, an association response frame carrying a first QoS parameter set, where the first QoS parameter set is a default QoS parameter set, the first QoS parameter set includes multiple QoS parameters, for different AC of access channels, of the terminal, and the network device is an AP or a wireless controller managing the AP.

Optionally, sending, by the network device to the terminal, an association response frame carrying a first QoS parameter set includes sending, by the network device to the terminal, an association response message carrying an EDCA parameter set element, where the EDCA parameter set element includes the first QoS parameter set.

Optionally, the AP periodically broadcasts a second beacon frame when the network device is an AP, where the second beacon frame carries an EDCA parameter set element lacking a QoS parameter set. Certainly, optionally, the AP may not need to periodically broadcast the second beacon frame, which is not limited in the present disclosure.

Optionally, the AP may periodically broadcast a beacon frame. The beacon frame carries a simplified EDCA parameter set element, and the simplified EDCA parameter set element refers to an EDCA parameter set element lacking a QoS parameter set. The simplified EDCA parameter set element includes only an Element ID, a Length, QoS Info, and a reserved field, that is, the simplified EDCA parameter set element does not include parameter record fields of AC. The simplified EDCA parameter set element represents that the AP has a capability of generating an EDCA parameter set element, the AP does not change the QoS parameter set of the terminal in the beacon frame, and the terminal receiving the beacon frame does not need to change the QoS parameter set.

The AP may periodically broadcast a beacon frame. If the EDCA parameter set element in the beacon frame includes a QoS parameter set, after the terminal receives the beacon frame, a QoS parameter set currently stored in the terminal is overwritten by the QoS parameter set in the beacon frame. If the beacon frame does not include the EDCA parameter set element, the terminal cannot determine that the AP has the capability of generating an EDCA parameter set element. Therefore, to ensure that the AP can notify the terminal that the AP has the capability of generating an EDCA parameter set element and does not change the QoS parameter set of the terminal, a beacon frame carrying a simplified EDCA parameter set element may be sent to the terminal.

After receiving the beacon frame that is broadcast by the AP and that carries the simplified EDCA parameter set element, the terminal determines that the AP has the capability of generating an EDCA parameter set element. The terminal may add the simplified EDCA parameter set element to the association request frame of the terminal, to notify the AP that the terminal has a capability of parsing an EDCA parameter set element.

Alternatively, the network device may not broadcast a beacon frame. Before the terminal is associated with the AP, the terminal sends the association request frame to the network device, to instruct the network device to configure a QoS parameter set for the terminal.

Therefore, after receiving the association request frame sent by the terminal, the network device sends, to the terminal, the association response frame carrying the first QoS parameter set. The association request frame carries an EDCA parameter set element of the first QoS parameter set. The first QoS parameter set is a QoS parameter set that is set by default by the network device for all terminals.

After receiving the association response frame that carries the first QoS parameter set and that is sent by the network device, the terminal performs access channel configuration based on multiple QoS parameters of different AC of access channels in the first QoS parameter set, and transmits a data packet to a network side.

Step 302: The network device sends a QoS parameter set modification message to the terminal, where the QoS parameter set modification message includes a second QoS parameter set, the second QoS parameter set is different from the first QoS parameter set, and the QoS parameter set modification message is a first beacon frame or an active probe response frame, where a recipient address of the first beacon frame is a MAC address of the terminal, and the MAC address of the terminal is a unicast address, and the active probe response frame is a probe response frame actively sent by the network device to the terminal without relying on a probe request frame sent by the terminal.

Optionally, sending, by the network device, a QoS parameter set modification message to the terminal includes sending, by the network device to the terminal, a QoS parameter set modification message carrying an EDCA parameter set element, where the EDCA parameter set element includes the second QoS parameter set.

The first beacon frame is also referred to as a unicast beacon frame.

The recipient address in the first beacon frame is the MAC address of the terminal. In this way, even if another terminal receives the first beacon frame, the other terminal does not process the first beacon frame, which ensures that the network device dynamically adjusts a QoS parameter set of the terminal on a per terminal basis.

Generally, the network device sends a corresponding probe response frame to the terminal only after receiving a probe request frame of the terminal. An active probe response frame refers to a probe response frame actively sent by the network device to the terminal instead of responding to a received probe request frame. In this way, it can be ensured that the network device dynamically adjusts, on a per terminal basis, a QoS parameter set for the terminal at a specified time without triggering the terminal.

Optionally, before step 302 is performed, the processing procedure of the method further includes the following steps.

Step a: The network device acquires a data packet of the terminal.

Step b: The network device determines, according to a priority of the data packet, that an access category of the data packet is a first access category, and determines that a protocol category of the data packet is a high priority protocol category.

Step c: The network device determines, according to a preset correspondence between multiple AC and multiple protocol categories, a second access category corresponding to the high priority protocol category, where a priority of the second access category is higher than a priority of the first access category.

Step d: The network device acquires a high priority QoS parameter according to a preset correspondence between multiple AC and multiple QoS parameters, where the high priority QoS parameter is a QoS parameter corresponding to the second access category.

Step e: The network device generates the second QoS parameter set according to the QoS parameter corresponding to the determined second access category, where a QoS parameter of the first access category in the second QoS parameter set is the high priority QoS parameter.

In step a, the data packet of the terminal acquired by the network device is a data packet sent by the terminal to the network device or a data packet sent by the network device to the terminal. Although the data packet sent by the network device to the terminal is not controlled by a QoS parameter setting of the terminal, a response packet (for example, a transmission control protocol (TCP) response packet) of the data packet may have impact on sending of a subsequent packet of the data packet. Therefore, the foregoing method may also be applied to the data packet sent by the network device to the terminal.

Step b is performed. When the network device determines, according to the priority of the data packet, that the access category of the data packet is the first access category, the data packet includes a priority field, used to indicate the priority of the data packet. For example, a type of service (TOS), a class of service (COS), a differentiated service code point (DSCP), and the like can all be used to indicate the priority of the data packet. A correspondence between a priority and an access category of the data packet is generally set in the network device and the terminal. Therefore, an access category of the data packet sent by the terminal or an access category of a response packet of the data packet may be estimated according to a priority value in the data packet.

For example, a value of a COS priority in a MAC header ranges from 0 to 7, where if the value of the COS priority is 6 or 7, a corresponding access category is AC_VO, and if the value of the COS priority is 4 or 5, a corresponding access category is AC_VI. For another example, values of a DSCP class selector (CS) in an Internet Protocol (IP) packet header include CS0 to CS6, where each value of the CS may be mapped to a MAC header priority. For example, if a value of the MAC header priority corresponding to CS0 is 0, a corresponding access category is AC_BK, and if a value of the MAC header priority corresponding to CS6 is 7, a corresponding access category is AC_VO.

Optionally, packet content of the data packet further includes a protocol category. If the protocol category is a high priority protocol category, the network device may determine that the packet content of the data packet is content that should be transmitted at a high priority. The high priority protocol category is, for example, the real-time transport protocol (RTP), the real-time transport control protocol (RTCP), or the real-time streaming protocol (RTSP).

When step c is performed, the network device determines the second access category corresponding to the high priority protocol category.

If the packet content of the data packet is content that should be transmitted at a high priority, the AC of the data packet should be a high priority access category, that is, a high priority protocol category corresponds to a high priority access category. For example, an access category corresponding to protocols such as the RTP, the RTCP, and the RTSP is AC_VO or AC_VI. Either of AC_VO and AC_VI may be selected as the access category corresponding to the protocols such as the RTP, the RTCP, and the RTSP. Optionally, to clearly distinguish whether the access category is AC_VO or AC_VI, the access category may further be selected with reference to a size of a packet of a service flow. For example, when a length of multiple consecutive packets in the service flow is greater than a specified threshold (for example, 256 bytes), it is determined that the service flow is AC_VI, otherwise, the service flow is AC_VO. Therefore, after determining the high priority protocol category, the network device may determine, according to the preset correspondence between multiple AC and multiple protocol categories, the second access category corresponding to the high priority protocol category.

When step d is performed, according to the foregoing description of the QoS parameter set in the EDCA parameter set element, it can be known that the network device sets different corresponding QoS parameters for different AC. Generally, a QoS parameter having a relatively high priority is set for an access category that has a relatively high requirement on timeliness, while a QoS parameter having a relatively low priority is set for an access category that does not have a high requirement on timeliness. Therefore, a corresponding QoS parameter may be determined for the second access category. Generally, when the terminal sends a packet (for example, a video packet or a response packet of the video packet) that should be transmitted at a high priority, an AC (for example, AC_BE) having a relatively low priority is actually used. As a result, data transmission efficiency is low, and user experience is degraded. Therefore, a QoS parameter of the AC, having a relatively low priority, of the terminal may be adjusted to a high priority QoS parameter, to improve data transmission efficiency.

When step e is performed, the QoS parameter of the first access category (for example, AC_BE) is modified into the QoS parameter of the second access category (for example, AC_VI). In this way, even though the terminal still sends a packet using the first access category (for example, AC_BE), the QoS parameter of the first access category has been upgraded, thereby ensuring data transmission efficiency and improving user experience. Optionally, when step e is performed, the QoS parameter of the first access category in the first QoS parameter set may be modified into the QoS parameter of the second access category, to generate the second QoS parameter set in order to ensure that a QoS parameter of another access category is not changed. After the protocol category of the data packet of the terminal is no longer the high priority protocol category having a high priority, the network device may change the parameter set of the terminal back to the first QoS parameter set.

For example, when the terminal performs voice or video communication using a third-party application or a web page, the terminal generally performs communication using AC_BE, that is, the data packet generated by the terminal is an AC_BE access category, and a QoS parameter corresponding to AC_BE cannot meet a requirement on real-time communication. Because the protocol category of the data packet generated by the terminal is still a protocol category corresponding to AC_VO/AC_VI, the network device may determine, using the protocol category, that an actual access category of the data packet generated by the terminal is AC_VO/AC_VI. Therefore, the network device modifies the QoS parameter corresponding to AC_BE into a QoS parameter corresponding to AC_VO/AC_VI. In this way, the terminal sends the data packet of AC_BE using a high priority QoS parameter.

By means of the foregoing embodiment of the present disclosure and with reference to the method for determining a second QoS parameter set in step a to step e, after sending the default first QoS parameter set to the terminal, the network device determines that the access category of the data packet of the terminal is the first access category, determines the second access category according to the protocol category of the data packet, when determining that the first access category is different from the second access category, determines a corresponding QoS parameter according to the second access category, and sends, to the terminal using a unicast beacon frame or an active probe response frame, the second QoS parameter set in which the QoS parameter of the first access category is the determined QoS parameter. In this way, an actual second access category of the data packet of the terminal may be determined, and a corresponding QoS parameter is determined according to the actual second access category, to modify the QoS parameter of the first access category, and further to adjust a capability of preempting a channel by the terminal, thereby improving data transmission efficiency and improving user experience. The network device sends the modified QoS parameter set to the terminal using the unicast beacon frame or the active probe response frame such that the network device can dynamically adjust a QOS parameter set of the terminal on a per terminal basis.

Optionally, before step 302 is performed, the processing procedure of the method further includes determining, by the network device, an identity category of the terminal, and determining, by the network device according to a preset correspondence between multiple identity categories and multiple QoS parameter sets, that the second QoS parameter set is a QoS parameter set corresponding to the identity category of the terminal.

By means of the foregoing embodiment of the present disclosure and with reference to the method for determining a second QoS parameter set in the foregoing steps, after sending the default first QoS parameter set to the terminal, the network device determines that the QoS parameter set corresponding to the identity category of the terminal is the second QoS parameter set, where the second QoS parameter set is different from the first QoS parameter set, and sends the second QoS parameter set to the terminal using the unicast beacon frame or the active probe response frame. In this way, the corresponding QoS parameter set may be determined according to the identity category, and further, the capability of preempting a channel by the terminal is adjusted, thereby improving data transmission efficiency and improving user experience. For example, a terminal of a guest user is adjusted to a QoS parameter set having a low priority, and a terminal of a senior user is adjusted to a QoS parameter set having a high priority. The network device sends the modified QoS parameter set to the terminal using the unicast beacon frame or the active probe response frame such that the network device can dynamically adjust a QOS parameter set of the terminal on a per terminal basis.

Figure 4:
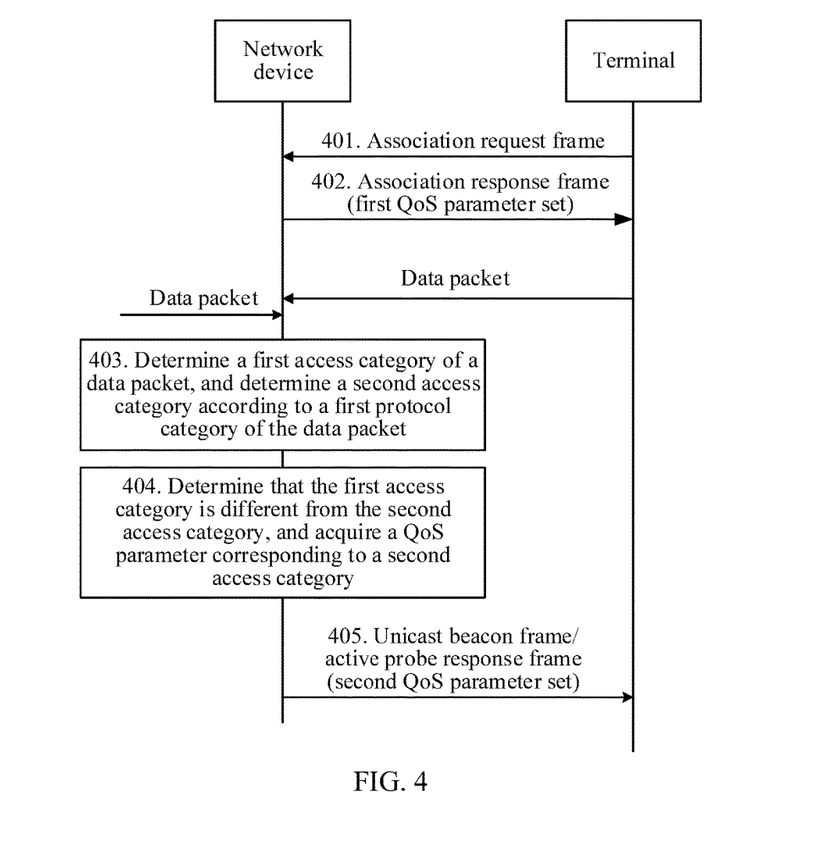
FIG. 4 is a specific flowchart of a first method for QoS parameter configuration in a WLAN according to an embodiment of the present disclosure.

Based on the foregoing embodiment, an embodiment of the present disclosure provides a method for QoS parameter configuration in a WLAN. Referring to FIG. 4, a network device is an AP or a wireless controller managing the AP. A specific procedure of the method includes the following steps.

Step 401: A terminal sends an association request frame to a network device.

That the terminal sends the association request frame to the network device represents that the terminal requests to be associated with the network device.

Optionally, the AP periodically broadcasts a first beacon frame when the network device is an AP, where the first beacon frame carries an EDCA parameter set element lacking a QoS parameter set. Certainly, optionally, the AP may not need to periodically broadcast the first beacon frame.

The first beacon frame carries a simplified EDCA parameter set element. The simplified EDCA parameter set element includes only an Element ID, a Length, QoS Info, and a reserved field, that is, the simplified EDCA parameter set element does not include parameter record fields of AC. The simplified EDCA parameter set element represents that the AP has a capability of generating an EDCA parameter set element, the AP does not change the QoS parameter set of the terminal in a beacon frame, and the terminal receiving the beacon frame does not need to change the QoS parameter set.

Before step 401, a new simplified EDCA parameter set element is generated and is sent to the AP using the association request frame in order to notify the AP that the terminal has the capability of parsing an EDCA parameter set element if the terminal receives the first beacon frame broadcast by the AP, and determines that the AP has the capability of generating an EDCA parameter set element and the terminal has a capability of parsing an EDCA parameter set element.

Step 402: The network device sends, to the terminal, an association response frame carrying a first QoS parameter set.

The association response frame carries the EDCA parameter set element, and the EDCA parameter set element includes multiple QoS parameters of the terminal that are for different AC of access channels and that are set by default by the network device.

The terminal performs, according to the received first QoS parameter set, access channel configuration based on the multiple QoS parameters of different AC of access channels in the first QoS parameter set, and transmits a data packet to a network side.

Step 403: The network device acquires a data packet of the terminal, determines that an access category of the data packet is a first access category, determines that a protocol category of the data packet is a high priority protocol category, and determines a second access category according to the high priority protocol category.

Determining that an access category of the data packet is a first access category includes determining, according to a priority of the data packet, that the access category of the data packet is the first access category.

Determining a second access category according to the high priority protocol category includes determining, according to a preset correspondence between multiple AC and multiple protocol categories, the second access category corresponding to the high priority protocol category, where a priority of the second access category is higher than a priority of the first access category.

Step 404: When determining that the first access category is different from the second access category, the network device acquires a QoS parameter corresponding to the second access category.

Determining that the first access category is different from the second access category represents that the terminal accesses a channel using a QoS parameter corresponding to the first access category when actually transmitting a data packet of the second access category, which has impact on data transmission efficiency. Therefore, the QoS parameter corresponding to the second access category needs to be acquired and sent to the terminal in order to instruct the terminal to modify the QoS parameter.

Step 405: The network device sends a second QoS parameter set to the terminal using a unicast beacon frame or an active probe response frame, where a QoS parameter of the first access category in the second QoS parameter set is the QoS parameter of the determined second access category.

Optionally, when step e is performed, the QoS parameter of the first access category in the first QoS parameter set may be modified into the QoS parameter of the second access category, to generate the second QoS parameter set in order to ensure that a QoS parameter of another access category is not changed.

Optionally, the network device sends, to the terminal, a unicast beacon frame or a probe response frame carrying the EDCA parameter set element, where the EDCA parameter set element includes the second QoS parameter set.

In this way, an actual second access category of the data packet of the terminal may be determined, and a corresponding QoS parameter is determined according to the actual second access category, to modify the QoS parameter of the first access category, and further to adjust a capability of preempting a channel by the terminal, thereby improving data transmission efficiency and improving user experience. The network device sends the modified QoS parameter set to the terminal using the unicast beacon frame or the active probe response frame such that the network device can dynamically adjust a QOS parameter set of the terminal on a per terminal basis.

Figure 5:
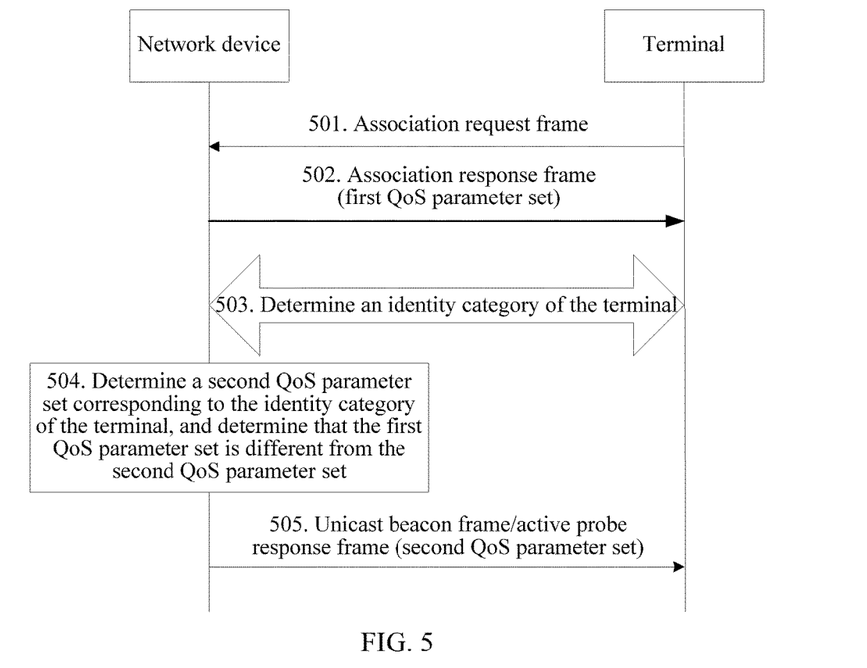
FIG. 5 is a specific flowchart of a second method for QoS parameter configuration in a WLAN according to an embodiment of the present disclosure.

Based on the foregoing embodiment, an embodiment of the present disclosure provides another method for QoS parameter configuration in a WLAN. Referring to FIG. 5, a network device is an AP or a wireless controller managing the AP. A specific procedure of the method includes the following steps.

Step 501: A terminal sends an association request frame to a network device.

That the terminal sends the association request frame to the network device represents that the terminal requests to be associated with the network device.

Optionally, the AP periodically broadcasts a first beacon frame when the network device is an AP, where the first beacon frame carries an EDCA parameter set element lacking a QoS parameter set. Certainly, optionally, the AP may not need to periodically broadcast the first beacon frame.

The first beacon frame carries a simplified EDCA parameter set element. The simplified EDCA parameter set element includes only an Element ID, a Length, QoS Info, and a reserved field, that is, the simplified EDCA parameter set element does not include parameter record fields of AC. The simplified EDCA parameter set element represents that the AP has a capability of generating an EDCA parameter set element, the AP does not change the QoS parameter set of the terminal in a beacon frame, and the terminal receiving the beacon frame does not need to change the QoS parameter set.

Before step 501, a new simplified EDCA parameter set element is generated and is sent to the AP using the association request frame in order to notify the AP that the terminal has the capability of parsing an EDCA parameter set element if the terminal receives the first beacon frame broadcast by the AP, and determines that the AP has the capability of generating an EDCA parameter set element and the terminal has a capability of parsing an EDCA parameter set element.

Step 502: The network device sends, to the terminal, an association response frame carrying a first QoS parameter set.

The association response frame carries the EDCA parameter set element, and the EDCA parameter set element includes multiple QoS parameters of the terminal that are for different AC of access channels and that are set by default by the network device.

The terminal performs, according to the received first QoS parameter set, access channel configuration based on the multiple QoS parameters of different AC of access channels in the first QoS parameter set, and transmits a data packet to a network side.

Step 503: The network device determines an identity category of the terminal.

During a process of authenticating an identity of the terminal, an existing authentication protocol is used, for example, portal authentication or 802.1x authentication.

Step 504: The network device determines, according to a preset correspondence between multiple identity categories and multiple QoS parameter sets, that a QoS parameter set corresponding to the identity category of the terminal is a second QoS parameter set, and determines that the second QoS parameter set is different from the first QoS parameter set.

Furthermore, a second access channel configuration parameter also includes the multiple QoS parameters, for different AC of access channels, of the terminal.

Step 505: The network device sends the second QoS parameter set to the terminal using a unicast beacon frame or an active probe response frame.

Optionally, the network device sends, to the terminal, a unicast beacon frame or a probe response frame carrying the EDCA parameter set element, where the EDCA parameter set element includes the second QoS parameter set.

In this way, a corresponding QoS parameter set may be determined according to the identity category, further to adjust a capability of preempting a channel by the terminal, thereby improving data transmission efficiency and improving user experience. The network device sends a modified QoS parameter set to the terminal using the unicast beacon frame or the active probe response frame such that the network device can dynamically adjust a QOS parameter set of the terminal on a per terminal basis.

Figure 6:
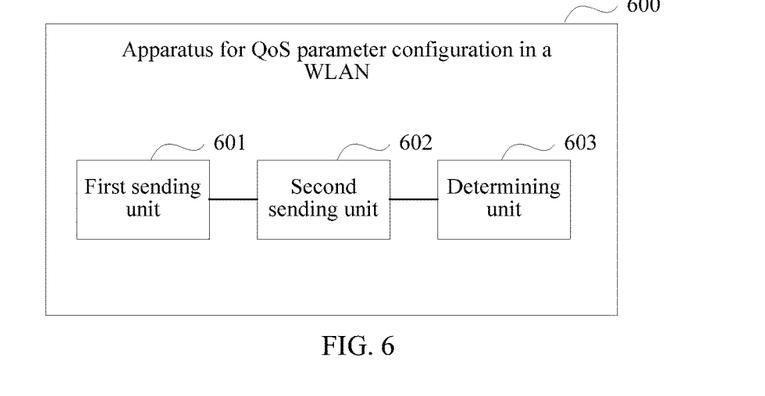
FIG. 6 is a schematic structural diagram of an apparatus for QoS parameter configuration in a WLAN according to an embodiment of the present disclosure.

Based on the foregoing embodiment, the present disclosure further provides an apparatus for QoS parameter configuration in a WLAN. Referring to FIG. 6, the apparatus for QoS parameter configuration in a WLAN 600 is implemented by a network device. The network device is an AP or a wireless controller managing the AP. The apparatus for QoS parameter configuration in a WLAN 600 includes a first sending unit 601 and a second sending unit 602, where the first sending unit 601 is configured to send, to the terminal, an association response frame carrying a first QoS parameter set after an association request frame sent by a terminal is received, where the first QoS parameter set is a default QoS parameter set, and the first QoS parameter set includes multiple QoS parameters, for different AC of access channels, of the terminal, and the second sending unit 602 is configured to send a QoS parameter set modification message to the terminal, where the QoS parameter set modification message includes a second QoS parameter set, the second QoS parameter set is different from the first QoS parameter set, and the QoS parameter set modification message is a first beacon frame or an active probe response frame, where a recipient address of the first beacon frame is a MAC address of the terminal, and the MAC address of the terminal is a unicast address, and the active probe response frame is a probe response frame actively sent by the apparatus to the terminal without relying on a probe request frame sent by the terminal.

Optionally, the apparatus for QoS parameter configuration in a WLAN 600 further includes a determining unit 603 configured to acquire a data packet of the terminal before the second sending unit 602 sends the QoS parameter set modification message to the terminal, determine, according to a priority of the data packet, that an access category of the data packet is a first access category, and determine that a protocol category of the data packet is a high priority protocol category, determine, according to a preset correspondence between multiple AC and multiple protocol categories, a second access category corresponding to the high priority protocol category, where a priority of the second access category is higher than a priority of the first access category, acquire a high priority QoS parameter according to a preset correspondence between multiple AC and multiple QoS parameters, where the high priority QoS parameter is a QoS parameter corresponding to the second access category, and generate the second QoS parameter set according to the QoS parameter corresponding to the determined second access category, where a QoS parameter of the first access category in the second QoS parameter set is the high priority QoS parameter.

Optionally, the apparatus for QoS parameter configuration in a WLAN 600 further includes a determining unit 603 configured to determine an identity category of the terminal before the second sending unit 602 sends the QoS parameter set modification message to the terminal, and determine, according to a preset correspondence between multiple identity categories and multiple QoS parameter sets, that the second QoS parameter set is a QoS parameter set corresponding to the identity category of the terminal.

Optionally, the network device is an AP, and the first sending unit 601 is further configured to periodically broadcast a second beacon frame, where the second beacon frame carries an EDCA parameter set element lacking a QoS parameter set.

Division of units in this embodiment of the present disclosure is exemplary and is merely logical function division. In an actual implementation, there may be another division manner. For example, a first acquiring unit and a second acquiring unit may be a same acquiring unit or a different acquiring units, or some features may be ignored or may not be executed. In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. All or some of the technical solutions of the present application may be implemented in a form of a software product. The computer software product is stored in a storage medium, and includes several instructions for instructing a computer device (which may be a personal computer, a server, a network device, or the like) or a processor to perform all or some of the steps of the methods described in the embodiments of the present application. The foregoing storage medium includes any medium that can store program code, such as a flash memory disk and a removable hard disk.

Figure 7:
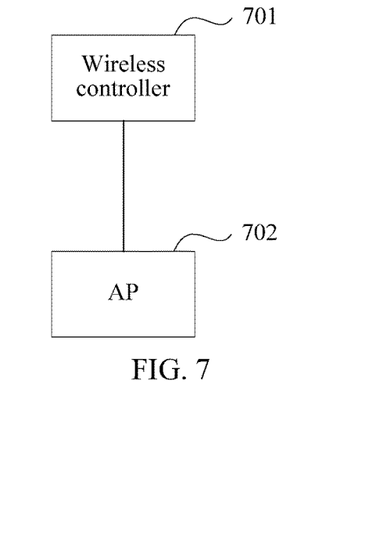
FIG. 7 is a structural diagram of a system for QoS parameter configuration in a WLAN according to an embodiment of the present disclosure.

Based on the foregoing embodiment, the present disclosure further provides a system for QoS parameter configuration in a WLAN. Referring to FIG. 7, the system includes a wireless controller 701 and an AP 702, where the wireless controller 701 is configured to send, to the terminal, an association response frame carrying a first QoS parameter set after an association request frame sent by a terminal is received, where the first QoS parameter set is a default QoS parameter set, and the first QoS parameter set includes multiple QoS parameters, for different AC of access channels, of the terminal, and send a QoS parameter set modification message to the terminal, where the QoS parameter set modification message includes a second QoS parameter set, the second QoS parameter set is different from the first QoS parameter set, and the QoS parameter set modification message is a first beacon frame or an active probe response frame, where a recipient address of the first beacon frame is a MAC address of the terminal, and the MAC address of the terminal is a unicast address, and the active probe response frame is a probe response frame actively sent by the wireless controller 701 to the terminal without relying on a probe request frame sent by the terminal, and the AP 702 is configured to send the association request frame to the wireless controller 701 after the association request frame sent by the terminal is received, receive the association response frame that carries the first QoS parameter set and that is sent by the wireless controller 701, send the association response frame to the terminal, receive the QoS parameter set modification message sent by the wireless controller 701, forward the QoS parameter set to the terminal, and periodically broadcast a second beacon frame, where the second beacon frame carries an EDCA parameter set element lacking a QoS parameter set.

Figure 8:
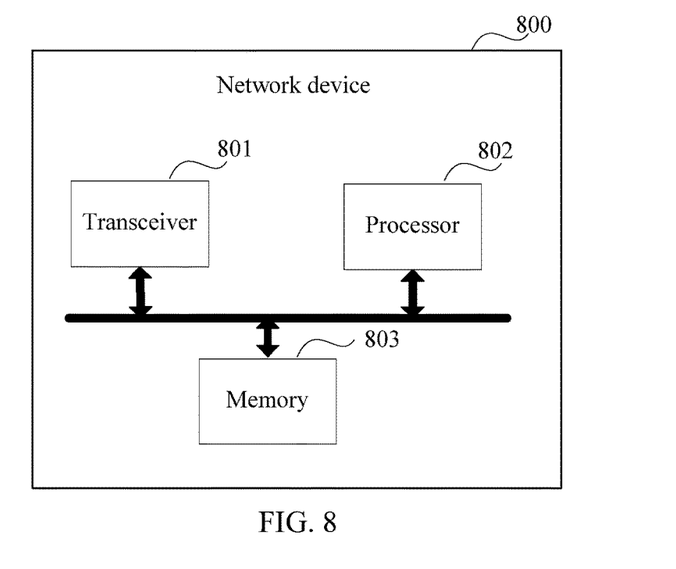
FIG. 8 is a schematic structural diagram of a network device according to an embodiment of the present disclosure.

Based on the foregoing embodiment, the present disclosure further provides a network device. The network device is an AP or a wireless controller managing the AP. Referring to FIG. 8, the network device 800 includes a transceiver 801, a processor 802, and a memory 803.

The transceiver 801, the processor 802, and the memory 803 are connected to one another.

The transceiver 801 is configured to communicate with a terminal, for example, receive an association request frame sent by the terminal, send an association response frame to the terminal, or send a QoS parameter set modification message to the terminal.

The processor 802 is configured to implement the method for QoS parameter configuration in a WLAN shown in FIG. 3 in the embodiments of the present disclosure, including sending, to the terminal, the association response frame carrying a first QoS parameter set after the association request frame sent by the terminal is received, where the first QoS parameter set is a default QoS parameter set, and the first QoS parameter set includes multiple QoS parameters, for different AC of access channels, of the terminal, and sending a QoS parameter set modification message to the terminal, where the QoS parameter set modification message includes a second QoS parameter set, the second QoS parameter set is different from the first QoS parameter set, and the QoS parameter set modification message is a first beacon frame or an active probe response frame, where a recipient address of the first beacon frame is a MAC address of the terminal, and the MAC address of the terminal is a unicast address, and the active probe response frame is a probe response frame actively sent by the network device 800 to the terminal without relying on a probe request frame sent by the terminal.

Optionally, the AP periodically broadcasts a second beacon frame when the network device 800 is an AP, where the second beacon frame carries an EDCA parameter set element lacking a QoS parameter set.

Optionally, before sending a QoS parameter set modification message to the terminal, the method further includes acquiring a data packet of the terminal, determining, according to a priority of the data packet, that an access category of the data packet is a first access category, determining that a protocol category of the data packet is a high priority protocol category, determining, according to a preset correspondence between multiple AC and multiple protocol categories, a second access category corresponding to the high priority protocol category, where a priority of the second access category is higher than a priority of the first access category, acquiring a high priority QoS parameter according to a preset correspondence between multiple AC and multiple QoS parameters, where the high priority QoS parameter is a QoS parameter corresponding to the second access category, and generating the second QoS parameter set according to the QoS parameter corresponding to the determined second access category, where a QoS parameter of the first access category in the second QoS parameter set is the high priority QoS parameter.

Optionally, before sending a QoS parameter set modification message to the terminal, the method further includes determining an identity category of the terminal, and determining, according to a preset correspondence between multiple identity categories and multiple QoS parameter sets, that the second QoS parameter set is a QoS parameter set corresponding to the identity category of the terminal.

The processor 802 may be a central processing unit (CPU), a network processor (NP), or a combination of a CPU and an NP. The processor 802 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof. The memory 803 may include a volatile memory, such as a random access memory (RAM). The memory 803 may also include a non-volatile memory, such as a read-only memory (ROM), a flash memory, a hard disk drive (HDD) or a solid state drive (SSD). The memory 803 may further include a combination of the foregoing categories of memories. The memory 803 is configured to store QoS parameter sets.

According to the method, apparatus, and system for QoS parameter configuration in a WLAN that are provided in the embodiments of the present disclosure, a network device sends a default first QoS parameter set to a terminal, and the network device sends a QoS parameter set modification message including a second QoS parameter set to the terminal, where the second QoS parameter set is different from the first QoS parameter set, and the QoS parameter set modification message is a unicast beacon frame or an active probe response frame. In this way, the second QoS parameter set different from the first QoS parameter set is sent to the terminal using the unicast beacon frame or the active probe response frame, which ensures that the network device dynamically adjusts a QoS parameter set of the terminal on a per terminal basis, thereby improving data transmission efficiency and user experience.

Although the embodiments of the present disclosure have been described, persons skilled in the art can make changes and modifications to these embodiments once they learn the basic inventive concept. Therefore, the following claims are intended to be construed as to cover the embodiments of the present disclosure and all changes and modifications falling within the scope of the claims.

What is claimed is:

1. A method for quality of service (QoS) parameter configuration in a wireless local area network (WLAN), comprising:
   sending, by a network device to a terminal, an association response frame carrying a first QoS parameter set after the network device receives an association request frame from the terminal, the first QoS parameter set being a default QoS parameter set, the first QoS parameter set comprising multiple QoS parameters, for different access categories of access channels, of the terminal, and the network device being an access point (AP) or a wireless controller managing the AP;
   acquiring, by the network device, a data packet of the terminal;
   determining, by the network device according to a priority of the data packet, that an access category of the data packet is a first access category;
   determining, by the network device according to the priority of the data packet, that a protocol category of the data packet is a high priority protocol category;
   determining, by the network device according to a preset correspondence between multiple access categories and multiple protocol categories, a second access category corresponding to the high priority protocol category, a priority of the second access category being higher than a priority of the first access category;
   acquiring, by the network device, a high priority QoS parameter according to another preset correspondence between the multiple access categories and the multiple QoS parameters, the high priority QoS parameter being a QoS parameter corresponding to the second access category;
   generating, by the network device, a second QoS parameter set according to the QoS parameter corresponding to the second access category, a QoS parameter of the first access category in the second QoS parameter set being the high priority QoS parameter; and
   sending, by the network device, a QoS parameter set modification message to the terminal, the QoS parameter set modification message comprising the second QoS parameter set, the second QoS parameter set being different from the first QoS parameter set, the QoS parameter set modification message being a unicast beacon frame, a recipient address of the unicast beacon frame being a medium access control (MAC) address of the terminal, and the MAC address of the terminal being a unicast address.

2. The method of claim 1, wherein before sending, by the network device, the QoS parameter set modification message to the terminal, the method further comprises:
   determining, by the network device, an identity category of the terminal; and
   determining, by the network device according to a preset correspondence between multiple identity categories and multiple QoS parameter sets, that the second QoS parameter set is a QoS parameter set corresponding to the identity category of the terminal.

3. The method of claim 1, further comprising periodically broadcasting, by the AP, a broadcast beacon frame when the network device is the AP, the broadcast beacon frame carrying a simplified enhanced distributed channel access (EDCA) parameter set element.

4. The method of claim 1, wherein the QoS parameter set modification message is configured such that only the terminal having the MAC address is capable of processing the QoS parameter set modification message to acquire the second QoS parameter set, and other terminals that receive the QoS parameter set modification message are not capable of processing the QoS parameter set modification message to acquire the second QoS parameter set.

5. The method of claim 1, wherein the first QoS parameter set is a QoS parameter set that is set by default by the network device for all terminals, and the second QoS parameter set is set only for the terminal having the MAC address.

6. An apparatus for quality of service (QoS) parameter configuration in a wireless local area network (WLAN), the apparatus for QoS parameter configuration being implemented by a network device, the network device being an access point (AP) or a wireless controller managing the AP, and the apparatus comprising:
  a processor; and
  a transceiver coupled to the processor and configured to:
    send, to a terminal, an association response frame carrying a first QoS parameter set after an association request frame from the terminal is received, the first QoS parameter set being a default QoS parameter set, and the first QoS parameter set comprising multiple QoS parameters, for different access categories of access channels, of the terminal;
    acquire a data packet of the terminal before the transceiver send the QoS parameter set modification message to the terminal;
    determine, according to a priority of the data packet, that an access category of the data packet is a first access category;
    determine, according to the priority of the data packet, that a protocol category of the data packet is a high priority protocol category;
    determine, according to a preset correspondence between multiple access categories and multiple protocol categories, a second access category corresponding to the high priority protocol category, a priority of the second access category being higher than a priority of the first access category;
    acquire a high priority QoS parameter according to another preset correspondence between the multiple access categories and the multiple QoS parameters, the high priority QoS parameter being a QoS parameter corresponding to the second access category;
    generate a second QoS parameter set according to the QoS parameter corresponding to the second access category, a QoS parameter of the first access category in the second QoS parameter set being the high priority QoS parameter; and
    send a QoS parameter set modification message to the terminal, the QoS parameter set modification message comprising the second QoS parameter set, the second QoS parameter set being different from the first QoS parameter set, the QoS parameter set modification message being a unicast beacon frame, a recipient address of the unicast beacon frame being a medium access control (MAC) address of the terminal, and the MAC address of the terminal being a unicast address.

7. The apparatus of claim 6, wherein the processor is further configured to:
  determine an identity category of the terminal before the transceiver send the QoS parameter set modification message to the terminal; and
  determine, according to a preset correspondence between multiple identity categories and multiple QoS parameter sets, that the second QoS parameter set is a QoS parameter set corresponding to the identity category of the terminal.

8. The apparatus of claim 6, wherein the network device is the AP, the transceiver is further configured to periodically broadcast a broadcast beacon frame, and the broadcast beacon frame carrying a simplified enhanced distributed channel access (EDCA) parameter set element.

9. The apparatus of claim 6, wherein the QoS parameter set modification message is configured such that only the terminal having the MAC address is capable of processing the QoS parameter set modification message to acquire the second QoS parameter set, and other terminals that receive the QoS parameter set modification message are not capable of processing the unicast beacon frame to acquire the second QoS parameter set.

10. The apparatus of claim 6, wherein the first QoS parameter set is a QoS parameter set that is set by default by the network device for all terminals, and the second QoS parameter set is set only for the terminal having the MAC address.

11. A method for quality of service (QoS) parameter configuration in a wireless local area network (WLAN), comprising:
  sending, by a network device to a terminal, an association response frame carrying a first QoS parameter set after the network device receives an association request frame from the terminal, the first QoS parameter set being a default QoS parameter set, the first QoS parameter set comprising multiple QoS parameters, for different access categories of access channels, of the terminal, and the network device being an access point (AP) or a wireless controller managing the AP;
  acquiring, by the network device, a data packet of the terminal;
  determining, by the network device according to a priority of the data packet, that an access category of the data packet is a first access category;
  determining, by the network device according to the priority of the data packet, that a protocol category of the data packet is a high priority protocol category;
  determining, by the network device according to a preset correspondence between multiple access categories and multiple protocol categories, a second access category corresponding to the high priority protocol category, a priority of the second access category being higher than a priority of the first access category;
  acquiring, by the network device, a high priority QoS parameter according to another preset correspondence between the multiple access categories and the multiple QoS parameters, the high priority QoS parameter being a QoS parameter corresponding to the second access category;
  generating, by the network device, a second QoS parameter set according to the QoS parameter corresponding to the second access category, a QoS parameter of the first access category in the second QoS parameter set being the high priority QoS parameter; and
  sending, by the network device, a QoS parameter set modification message to the terminal, the QoS parameter set modification message comprising the second QoS parameter set, the second QoS parameter set being different from the first QoS parameter set, the QoS parameter set modification message being a unicast beacon frame, a recipient address of the unicast beacon frame being a medium access control (MAC) address of the terminal, and the MAC address of the terminal being a unicast address.

12. The method of claim 11, wherein before sending, by the network device, the QoS parameter set modification message to the terminal, the method further comprises:
   determining, by the network device, an identity category of the terminal; and
   determining, by the network device according to a preset correspondence between multiple identity categories and multiple QoS parameter sets, that the second QoS parameter set is a QoS parameter set corresponding to the identity category of the terminal.

13. The method of claim 11, further comprising periodically broadcasting, by the AP, a broadcast beacon frame when the network device is the AP, the broadcast beacon frame carrying a simplified enhanced distributed channel access (EDCA) parameter set element.

14. The method of claim 11, wherein the QoS parameter set modification message is configured such that only the terminal having the MAC address is capable of processing the QoS parameter set modification message to acquire the second QoS parameter set, and other terminals that receive the unicast beacon frame are not capable of processing the QoS parameter set modification message to acquire the second QoS parameter set.

\* \* \* \* \*